US008670460B2

(12) United States Patent
Breit et al.

(10) Patent No.: US 8,670,460 B2
(45) Date of Patent: Mar. 11, 2014

(54) METHOD AND SYSTEM FOR OPTIMIZED TRANSMISSION OF DATA BETWEEN A CONTROL DEVICE AND A PLURALITY OF FIELD DEVICES

(75) Inventors: Eugen Breit, Blomberg (DE); Juergen Jasperneite, Steinheim (DE); Joerg Jeschin, Einbeck (DE); Gunnar Lessmann, Nieheim (DE)

(73) Assignee: Phoenix Contact GmbH & Co. KG (DE)

( * ) Notice: Subject to any disclaimer, the term of this patent is extended or adjusted under 35 U.S.C. 154(b) by 348 days.

(21) Appl. No.: 12/438,498

(22) PCT Filed: Jan. 16, 2008

(86) PCT No.: PCT/EP2008/000280
§ 371 (c)(1),
(2), (4) Date: Nov. 13, 2009

(87) PCT Pub. No.: WO2008/089901
PCT Pub. Date: Jul. 31, 2008

(65) Prior Publication Data
US 2010/0074262 A1    Mar. 25, 2010

(30) Foreign Application Priority Data

Jan. 22, 2007  (DE) .......................... 10 2007 004 044

(51) Int. Cl.
*H04J 3/24*       (2006.01)
*G06F 15/16*     (2006.01)
(52) U.S. Cl.
USPC .......................................... 370/473; 709/236
(58) Field of Classification Search
None
See application file for complete search history.

(56) References Cited

U.S. PATENT DOCUMENTS 5,163,047 A * 11/1992 Perdikaris et al. ............ 370/401
6,515,976 B1 * 2/2003 Dent et al. .................... 370/336
(Continued)

FOREIGN PATENT DOCUMENTS

| CN | 1539097 A | 10/2004 |
| CN | 1581854 A | 2/2005 |
| JP | 09200236 A | 7/1997 |
| JP | 2000349768 | 12/2000 |

OTHER PUBLICATIONS

PCT International Search Report and Written Opinion, PCT/EP2008/000280, dated Apr. 8, 2008.

(Continued)

*Primary Examiner* — Timothy J Weidner
(74) *Attorney, Agent, or Firm* — Kaplan Breyer Schwarz & Ottesen, LLP (57) ABSTRACT

The invention relates to a method for optimized transmission of data between a control device and a plurality of field devices that are connected to one another via an IP-based communications network, wherein the data transmission is controlled using a Profinet protocol. The invention further relates to a control and data transmission installation (10) that is particularly suited to the performance of the method. With the control and data transmission installation (10), it is possible to transmit the data to be transmitted from a control device (20) to a group of field devices (30, 40, 50) in a single sum frame subdivided into data fields, and to transmit the data to be transmitted from a plurality of field devices to a control device likewise in only one common sum frame subdivided into data fields. In this manner, the transmission rate can be optimized with respect to standard Profinet frames.

16 Claims, 7 Drawing Sheets

(56) References Cited

U.S. PATENT DOCUMENTS

| | | | |
|---|---|---|---|
| 6,870,850 B1* | 3/2005 | Fichou et al. | 370/400 |
| 7,050,455 B2* | 5/2006 | Nishihara | 370/466 |
| 2002/0042845 A1 | 4/2002 | Burmann et al. | |
| 2002/0091838 A1* | 7/2002 | Rupp et al. | 709/227 |
| 2004/0250025 A1* | 12/2004 | Bruckner et al. | 711/149 |
| 2005/0083954 A1* | 4/2005 | Meyer-Grafe | 370/403 |
| 2005/0273182 A1* | 12/2005 | Pearce et al. | 700/20 |
| 2006/0029091 A1* | 2/2006 | Meyer-Graefe et al. | 370/431 |
| 2006/0083229 A1* | 4/2006 | Jordan et al. | 370/389 |
| 2006/0088196 A1 | 4/2006 | Popovich et al. | |
| 2006/0114943 A1* | 6/2006 | Kynast et al. | 370/509 |
| 2006/0161705 A1* | 7/2006 | Schultze et al. | 710/106 |
| 2006/0274746 A1* | 12/2006 | Kuschke et al. | 370/389 |
| 2008/0080521 A1* | 4/2008 | Sichner et al. | 370/400 |
| 2009/0055564 A1* | 2/2009 | Klotz et al. | 710/118 |

OTHER PUBLICATIONS

"Chinese Office Actin for Chinese International Application No. 2008800009757", Dated: May 25, 2011, Publisher: Chinese Patent Office, Published in: CN.

Japanese Office Action of Apr. 16, 2012 of Japanese Patent Application No. 2009-545867.

* cited by examiner

FIG. 7

METHOD AND SYSTEM FOR OPTIMIZED TRANSMISSION OF DATA BETWEEN A CONTROL DEVICE AND A PLURALITY OF FIELD DEVICES

FIELD OF THE INVENTION

The invention relates to a method for optimized transmission of data between a control device and a plurality of field devices that are connected to one another via an IP-based communications network, wherein the data transmission is controlled using a Profinet protocol. The invention further relates to a control and data transmission system that is particularly suited to the performance of the method.

BACKGROUND OF INVENTION

The Profinet standard, among others, which supports the controlling of field devices such as sensors and actuators by a higher-level control device, is used in automation technology.

One version of the Profinet standard is Profinet-IO, which is based on Ethernet technology. Profinet-IO was developed inside the Profibus user organization and standardized in IEC61158/IEC61784. Profinet-IO supports a so-called provider-consumer model, in which data is transmitted cyclically in real time from a data source, which is called a provider, to a data sink, which is called a consumer. Such providers and consumers are implemented both in an I/O control device and in I/O field devices. The cyclical data exchange between an I/O control device and a decentralized I/O field device takes place by way of a communication relationship (CR), which is set up between a provider and a consumer. A communication relationship of the control device to a field device is referred to as an output CR, while the communication relationship of a field device to the control device is referred to as an input CR.

SUMMARY OF THE INVENTION

Figure 1:
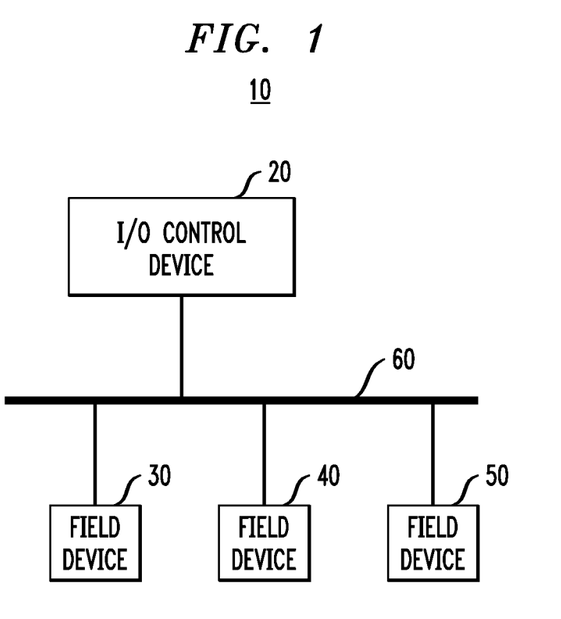
Figure 2:
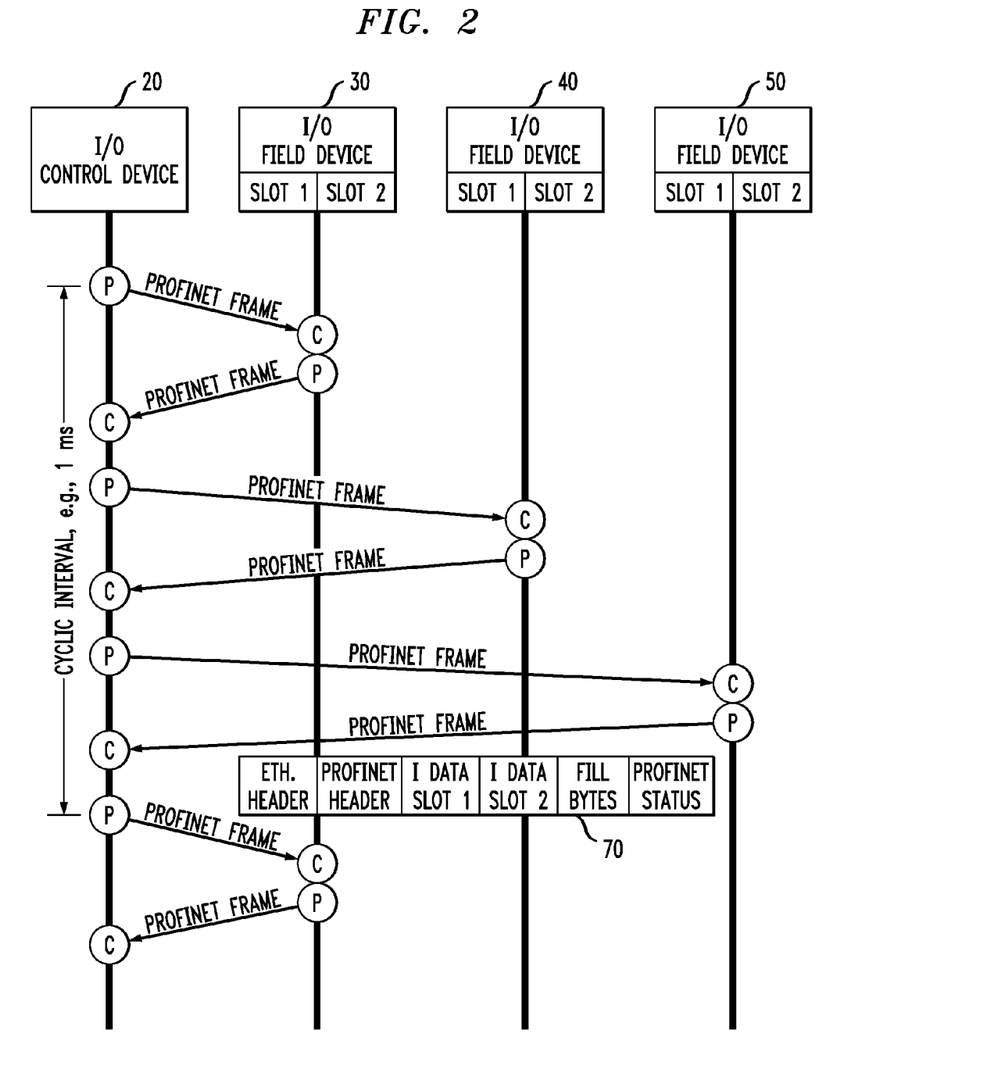

The mode of operation of a known communications system based on the Profinet-IO standard is schematically explained in FIG. 2. FIG. 2 shows the time sequence diagram of a communications cycle between a control device 20 and, for example, three field devices 30, 40 and 50 of a known communications system that is based on the Profinet IO standard. Such a communications system is schematically represented in FIG. 1. FIG. 1 shows a communications network 60 constructed on an Ethernet basis, to which the control device 20 as well as the three I/O field devices 30, 40 and 50 are connected.

We now return to FIG. 2. As shown in FIG. 2, the control device 20 must set up a separate output CR to each field device if it wishes to transmit data to the field devices. For this purpose, a provider application P is started in the control device, while a consumer application C is started in the respective field device. In the same manner, a separate input CR must be set up between the control device 20 and each field device that would like to transmit data to the control device 20. For this purpose, a provider application P is started in each field device, and a consumer application C is started in the control device 20 for each field device. These relationships are schematically represented in FIG. 2. According to the illustrated time sequence diagram, an output relationship is initially produced between the control device 20 and the field device 30. Then an input relationship is produced between the field device 30 and the control device 20. In a similar manner, output and input relationships are then set up in temporal succession between the control device 20 and the field devices 40 and 50.

For each output CR, an Ethernet packet, into which the Profinet frame containing the data to be transmitted is embedded, is generated in the control device's data link layer, which corresponds to Layer 2 of the OSI model, and is transmitted to the respective field device. In a similar manner, each field device that wishes to transmit data to the control device in an input CR generates an Ethernet packet, into which a Profinet frame is again embedded. FIG. 2 shows an example of an Ethernet packet 90, in which a Profinet frame is embedded, for an input CR from the field device 50 to the control device 20. In a conventional manner, the Ethernet packet 90 has an Ethernet header, which is followed by a Profinet header. The latter is followed by the input data to be transmitted by field device 50 (E data slot 1; E data slot 2), which data is subdivided into slots 1 and 2. It should be noted that, in the described embodiment variants, the data stored in the field devices is contained in two slots only for the sake of easy representation. The minimum length of an Ethernet packet is 72 bytes, of which 8 bytes are assigned to the preamble. With such a packet size, Profinet allows transmission of 44 bytes of payload data in one Ethernet packet. If the data to be transmitted by field device 50 has a smaller length, only 4 bytes for example, the remainder of the Ethernet packet is occupied by fill bytes, as shown in FIG. 2. The transmission of separate Ethernet packets between the control device and the field devices leads to unfavorable transmission behavior, particularly for automation components with a small payload data length. First, the transmission rate is low due to the small payload-to-fill data ratio. Second, correspondingly high cycle times result. Additionally, only a small number of subscribers can be active with a given cycle time, since the bandwidth of the transmission medium is limited to 100 Mbit/s, for example.

The invention is therefore based on the problem of providing a method as well as a control and data transmission installation, with which a more efficient data transmission between a control device and field devices can be achieved, with simultaneous compatibility with the Profinet standard.

A core concept of the invention is that the data to be transmitted from a control device to a plurality of field devices can be transmitted in a single frame subdivided into data fields, and the data to be transmitted from a plurality of field devices to a control device can likewise be transmitted in a single frame subdivided into data fields. In this manner, the transmission rate can be increased relative to the transmission rate achieved with a standard Profinet frame since, among other things, the number of fill bits to be transmitted can be reduced.

The above-specified technical problem is solved firstly by the method steps of claim 1.

Accordingly a method is provided for optimized transmission of data between a control device and a plurality of field devices. The field devices and the control device are connected to one another via an IP-based communications network, wherein the data transmission is monitored by a Profinet protocol.

In order to be able to transmit data from the control device to a plurality of N field devices in an output phase, a single frame in accordance with the Profinet protocol is generated (step a). This conventionally known Profinet frame is subdivided into N data fields that are assigned in a predetermined manner to the N field devices to which data is to be transmitted (step b). The assignment of data fields to the respective field devices can be done during the planning phase. Now data for the field device that is assigned to the respective data field is written into each data field of the subdivided Profinet frame, insofar as the control device has data for transmission to this field device available (step c). If all available data has been written to the data fields of the Profinet frame, then the subdivided Profinet frame is directed to each of the N field devices via the communications network (step d). For instance, the subdivided Profinet frame is embedded for this purpose in an Ethernet packet that can be generated in the data link layer of the control device. The subdivided Profinet frame passes through each of the N field devices, each field device reading data from the data field that is assigned to the respective field device (step e).

Alternatively or additionally, the method comprises an optimized transmission of data during an input phase, i.e., during a transmission of data from the field devices to the control device. For this purpose, a single frame is again generated in accordance with the Profinet protocol for transmitting data of the N field devices to the control device (step f). The Profinet frame is subdivided into N data fields that are assigned to the N field devices in a predetermined manner (step g). The subdivided Profinet frame is transferred to one of the N field devices (step h).

At this point it should be noted that the generation of the Profinet frame and the subdivision of the Profinet frame into data fields can take place in a predetermined field device among the N field devices or in a separate device. If the Profinet frame is generated in one of the N field devices and subdivided into data fields, then the step of transferring the Profinet frame to one of the N field devices means that the Profinet frame is transferred to a certain layer of the field device, in which data of the field device is written to the data field assigned to this field device in the subdivided Profinet frame. If the Profinet frame is generated in a separate processing device and subdivided into data fields, the step of transferring the Profinet frame to one of the N field devices means that the subdivided Profinet frame is transferred to this one field device by the processing device. The processing device can also be a component of this field device. The subdivided Profinet frame is transmitted successively to all N field devices, which upon receipt of the subdivided Profinet frame write data to the data field assigned to the respective field device (step i).

This method ensures that transmission can take place at a higher speed than with the standard protocol, since only a reduced number of fill bytes, and none at all in the best case, need be transmitted with the payload data.

Advantageous refinements are the subject matter of the subordinate claims.

The data transmission can be further optimized by deciding, depending on the amount of data to be transmitted to the N field devices and/or from the N field devices, whether the data from the N field devices and/or to the N field devices will be transported in a single subdivided Profinet frame, or whether the data from and/or to at least one of the N field devices will be transmitted in a respective separate conventional Profinet frame. The method can accordingly ensure that the data to be transmitted to and/or from a field device is transmitted in a separate conventional Profinet frame whenever the amount of data corresponds to essentially the length of the payload data field of the conventional Profinet frame, so that no or only a few fill bytes need be transmitted.

In case the data from and/or to the field devices cannot be transmitted in a single subdivided Profinet frame, steps a)-e) and/or f)-j) of method 1 are cyclically repeated until all data has been completely transmitted, particularly in real time, to the field devices or the control device.

According to a special embodiment, process steps a)-d), which belong to an output phase, are performed by the control device itself. Alternatively, steps a)-d) can be performed by an optimization device, referred to below as a head station that is associated with the control device. Before a Profinet frame can be generated, however, the control device generates a separate conventional Profinet frame for each of the N field devices to which data is to be transmitted. The data to be transmitted to the respective field device is written into each Profinet frame. The control device then preferably transfers the Profinet frames one after another, using the destination address of the respective field device, to the optimization device. In the optimization device, the destination addresses are replaced by a multicast address that is written to the subdivided Profinet frame. Then steps c) and d) are performed by the optimization device.

The use of an optimization device has the advantage that conventional control devices can also be used to perform the method according to the invention.

During the input phase, the optimization device receives a subdivided Profinet frame that is destined for the control device. The data of each data field of the subdivided Profinet frame is then written to a separate Profinet frame. Each Profinet frame now contains data of one give N field device. Using the source address of the respective field device, each Profinet frame is now transmitted in its own Ethernet packet to the control device. Based on the source address, the control device recognizes the field device from which the data in the respective Profinet frame originate.

The above-mentioned technical problem is likewise solved by a control and data transmission system for optimized transmission of data between a control device and a plurality of field devices. The control device and a plurality of N field devices are connected by an IP-based communications network, wherein a Profinet protocol is used as the communications protocol. A device for optimizing data transmission is associated with the control device. The optimization device has a device for generating a single frame in accordance with a Profinet protocol for transmitting data to N field devices. The optimization device additionally has a device for subdividing the Profinet frame into N data fields and for assigning the N data fields to the N field devices in a predetermined manner. A device for targeted writing of data to the data fields of the subdivided Profinet frame, as well as a device for transmitting the subdivided Profinet frame to each of the N field devices, is additionally provided. Each field device is designed to read out the data intended for it from the associated data field of the subdivided Profinet frame.

In a preferred embodiment, the optimization device is implemented in the control device.

In an alternative embodiment, the optimization device is implemented in one of the N field devices or as a separate device that is connected to the communications network. In this case, the optimization device has a first device for receiving conventional Profinet frames, each intended for one of the N field devices, from the control device. Also provided is a device for reading out data from the received Profinet frames, wherein the writing device is constructed for writing the read-out data into the data fields associated with the respective field devices in the Profinet frame. A second device for receiving a subdivided Profinet frame intended for the control device is also provided. Additionally, a device for writing the data of each data field of the subdivided Profinet frame into a separate conventional Profinet frame, as well as a device for transmitting the conventional Profinet frames to the control device by using the source address of the respective field device can be provided.

In order to transmit data from the field devices to the control device, at least one of the N field devices has a device for generating a frame in accordance with a Profinet protocol, as well as a device for subdividing the Profinet frame into N data fields. Each of the N field devices is then constructed for writing data into the data field associated with the respective field device in the subdivided Profinet frame.

In order that the subdivided Profinet frame transferred from the optimization device to the communications network can also be received by each of the N field devices, the optimization device has a device that can write a multicast address into an IP packet that transmits the subdivided Profinet frame to the N field devices. In this case, each of the N field devices knows both its own source address and the multicast address that allows a transmission of the subdivided Profinet frame to the group of field devices.

In order to further optimize the efficiency of the control and data transmission installation with respect to transmission speed, the optimization device has a decision device that, as a function of the amount of data to be transmitted to the N field devices and/or from the N field devices, can decide whether the data from the N field devices and/or the data to the N field devices should be transmitted in a respective single subdivided Profinet frame, or whether the data from and/or to at least one of the N field devices should be transmitted in a respective separate conventional Profinet frame to or from the control device.

The IP-based communications network is preferably an Ethernet, in particular, a Fast Ethernet.

The method, as well as the control and data transmission installation, can support all Profinet configuration mechanisms such as context management. In addition, standard Profinet field devices can be operated with field devices that support the optimized transmission service in real time. Due to the transmission of data to a plurality of field devices and from a plurality of field devices in a single Profinet frame subdivided into data fields, it is sufficient to transmit the cycle counter only one time, for example, whereby the data transmission can be further optimized.

BRIEF DESCRIPTION OF THE DRAWINGS

The invention will be described in detail below with reference to an embodiment, in connection with the appended drawings.

Therein,

FIG. 1 shows a control and data transmission system in which the invention is implemented, FIG. 2 a time sequence diagram of a transmission cycle between a control device and a plurality of field devices according to the standard Profinet, FIG. 3 a time sequence diagram on the transmission of data between a control device and a plurality of field devices by means of a single Profinet sum frame according to the invention, FIG. 4 the time sequence diagram of a transmission of data similar to FIG. 3, wherein a head station is used for providing the Profinet sum frame, FIG. 5 a Profinet sum frame according to the invention embedded in an Ethernet packet, FIG. 6 a schematic block diagram of the optimization module that can be implemented in the control device shown in FIG. 3 or in the head station shown in FIG. 4, and FIG. 7 a schematic block diagram of the field device shown in FIG. 1, in which the invention is implemented.

DETAILED DESCRIPTION

As a control and data transmission system, FIG. 1 shows an example automation system 10, in which the I/O control device 20 and, for the sake of example, three field devices 30, 40 and 50, which can function as I/O devices, are connected to a transmission medium based on Ethernet technology. It should be noted that the automation system 10 illustrated in FIG. 1 is constructed such that it can support data transmission both according to the standard Profinet protocol and in the optimized real-time operation according to the present invention.

Figure 4:
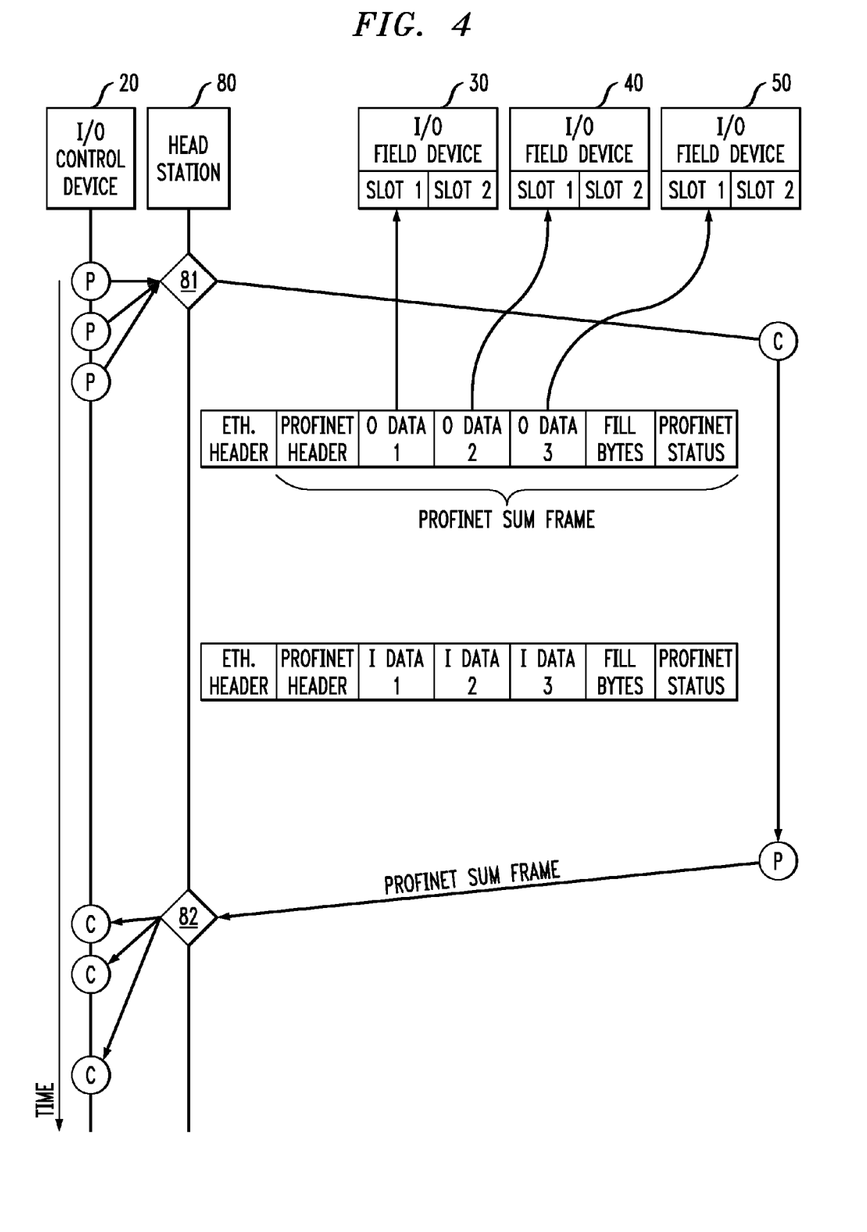
Figure 6:
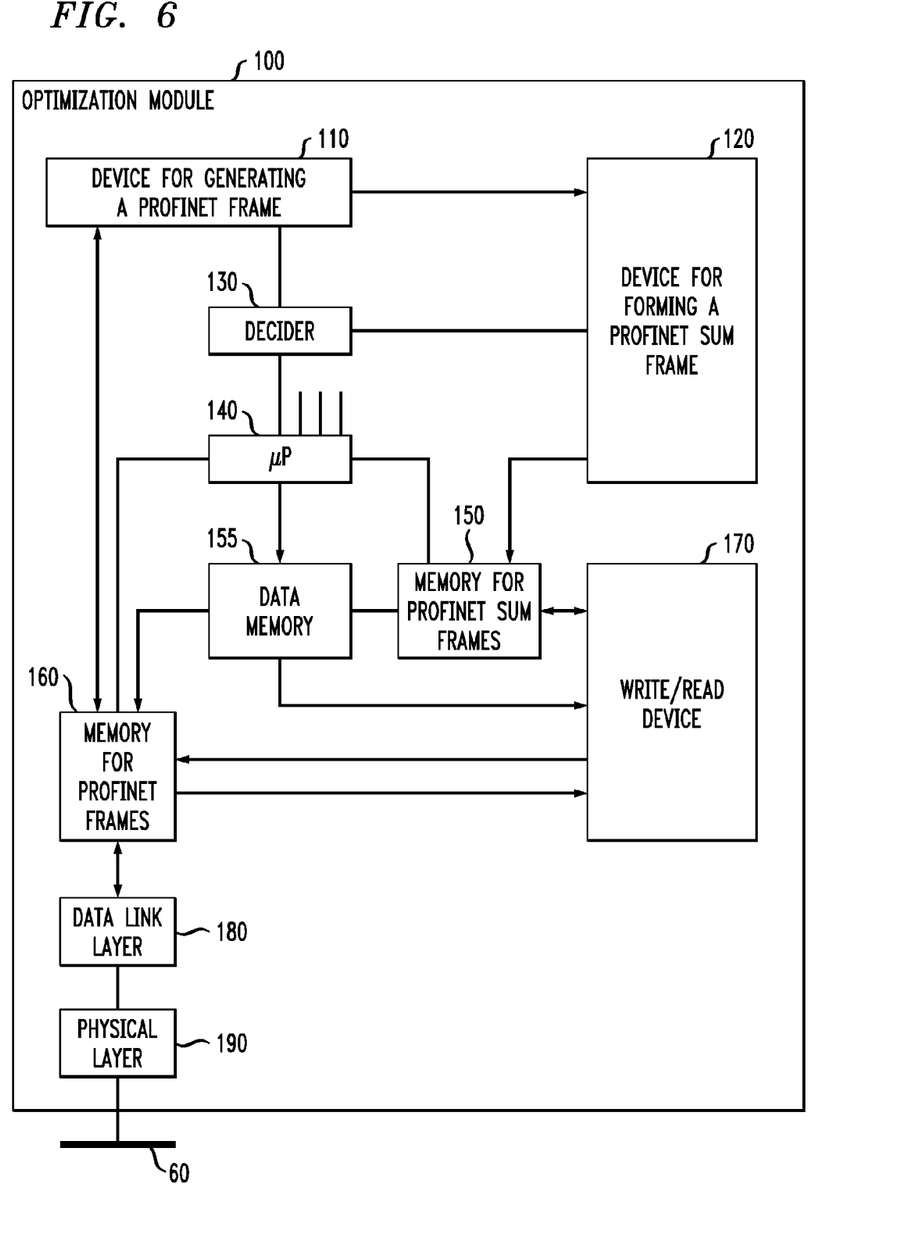

FIG. 6 shows an example of an optimization module 100 according to the invention, which can be implemented both in control device 20 and in a head station illustrated in FIG. 4. In order to support data transmission on the basis of the standard Profinet as well as transmission with a more efficient, i.e., higher, transmission speed, the optimization module has a device 110 for generating a Profinet frame according to the standard Profinet protocol as well as an additional generation device 120 that is constructed for forming a Profinet sum frame.

The generation device 120 serves to subdivide the Profinet frame according to the standard Profinet into a plurality of data fields into which the data intended for the respective field devices can be written. In a preferred embodiment, the conventional Profinet frame is stored by the generation device 110 in a Profinet frame memory 160. In a similar manner, the Profinet frame subdivided into data fields, referred to below as Profinet sum frame, is stored by the generation device 120 in a memory for Profinet sum frames 150. A write/read device 170 is connected to the two memories 160 and 150 in order to write data intended for the field devices either into a conventional Profinet frame that is directed to only one field device, or into the Profinet sum frame that contains the data for a group of field devices. The optimization module 100 additionally has a data link layer 180 and physical layer 190 that are based on Ethernet technology. These two layers correspond, respectively, to the second and the first layers of the OSI layer model. The optimization module 100 is connected via the physical layer 190 to the Ethernet 60. It should be noted at this point that the data link layer 180 and the physical layer 190 can be implemented at any point of the control device 20 or, if the optimization module is implemented in the head station 80, at any point of the head station 80. The association of these two layers with the optimization module is selected only for the sake of example. A control device or a microprocessor 140 is connected to all components of the optimization module in order to be able to monitor and control the optimization module 100. The microprocessor 140 is additionally connected to a decision device 130, which is in turn connected to the generation device 110 and the generation device 120. The decision device 130 is capable of deciding, on the basis of the amount of data to be transmitted to the field devices and/or from the field devices to the control device 20, whether the data should be transmitted in individual conventional Profinet frames to each individual field device or from the field devices to the control device 20 and/or in a common single Profinet sum frame to the group of field devices or from the group of field devices to the control device. For data transmission, the conventional Profinet frame and the Profinet sum frame as well are transferred to the data link layer 180, which embeds the respective frame in an Ethernet packet. An Ethernet packet 70 containing a Profinet sum frame is shown for the sake of example in FIG. 5. Only for the sake of example, let it be assumed that the Ethernet packet contains a minimum length of 72 bytes. In a conventional manner, the Ethernet packet contains a preamble 71, a target address field 72, a source address field 73, a type field 74 and a data field, in which the Profinet sum frame is now embedded. In the present case, the Profinet sum frame contains a field for the Profinet header 75, a first data field 76 that is associated with the field device 30, a second data field 77 that is associated with the field device 40 and a third data field 78 that is associated with the field device 50. In case the number of data items to be transmitted in the data fields is less than the payload data length provided by the Ethernet packet, fill bytes are stuffed into a corresponding field. At the end of the Profinet sum frame, a Profinet status field 79 is provided. The information in the Profinet status field 79 indicates, for example, whether a conventional Profinet frame or a Profinet sum frame is being transmitted in the Ethernet packet 70.

Figure 5:
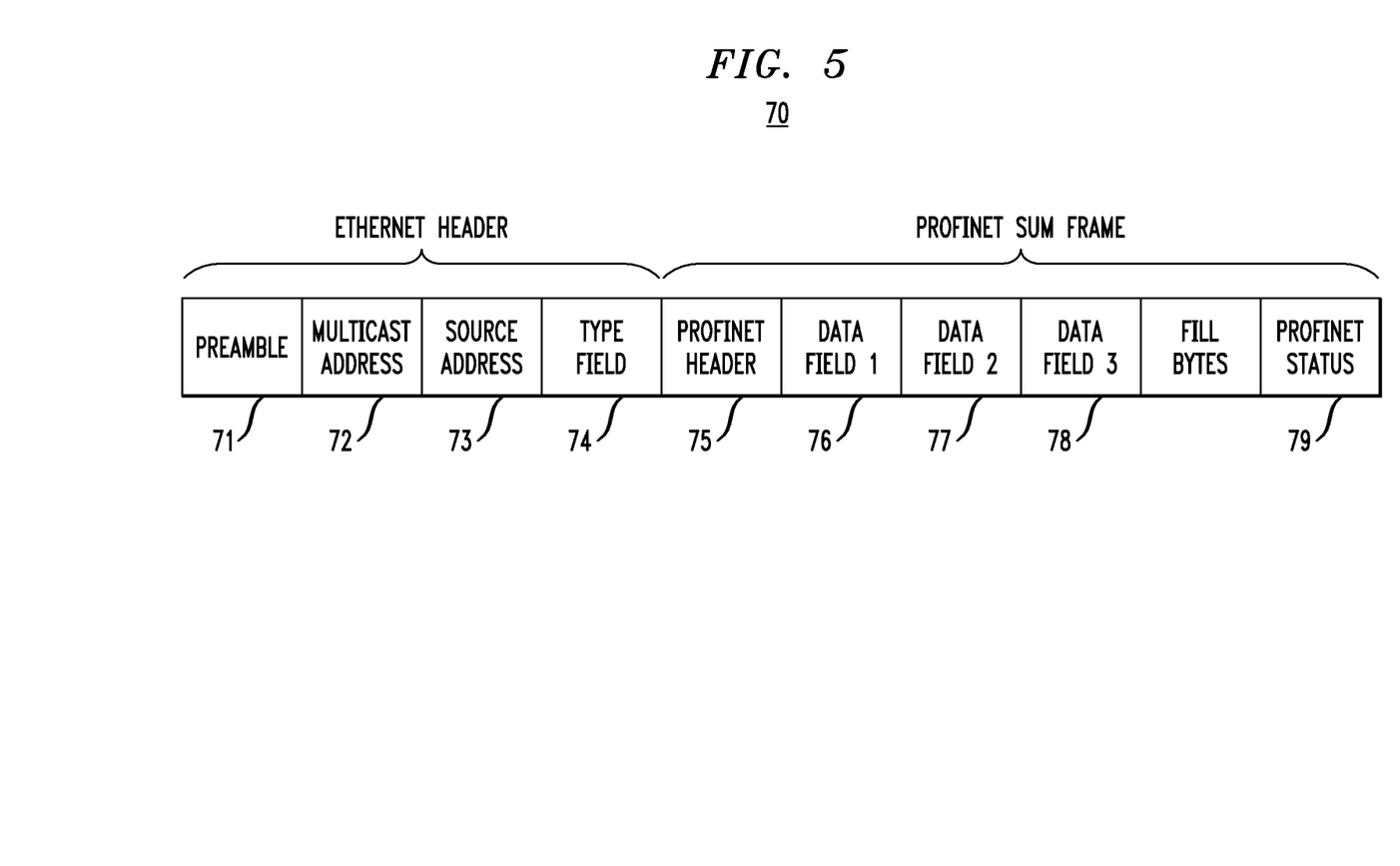

It should be noted at this point that, for the case in which a Profinet sum frame is being transmitted in the Ethernet packet 70, a multicast address that is known to the three field devices 30, 40 and 50 is written into the address field 72. If, on the other hand, a conventional Profinet frame is being transmitted in the Ethernet packet 70, the destination address of the respective recipient, which can be the control device 20 or one of the field devices 30, 40 or 50, is in the address field 72. If a Profinet sum frame is being transmitted from the control device to the field devices 30, 40 and 50, then the address of the control device 20 is in the source address field 73. If, on the other hand, a Profinet sum frame is being transmitted from the field devices 30, 40 and 50 to the control device 20, then the source field 73 can be empty. Instead, the multicast address can be in the address field 72, and an indication that a Profinet sum frame is now being transmitted can be in the Profinet status field. Based on these indications, the optimization module 100, which is associated with the head station 80 or the control device 20, is capable of recognizing that data has been received from a group of field devices, in this case the field devices 30, 40 and 50. In addition, both the optimization module 100 and the field devices 30, 40 and 50 are aware of which data field in the Profinet sum frame is associated with which field device.

As already mentioned, conventional Profinet devices, which can only receive and transmit conventional Profinet frames, can be used in the automation installation 10. Furthermore, field devices that can only receive and transmit Profinet sum frames can be connected. Field devices that can process both conventional Profinet frames and Profinet sum frames can also be connected to communications network 60.

Figure 7:
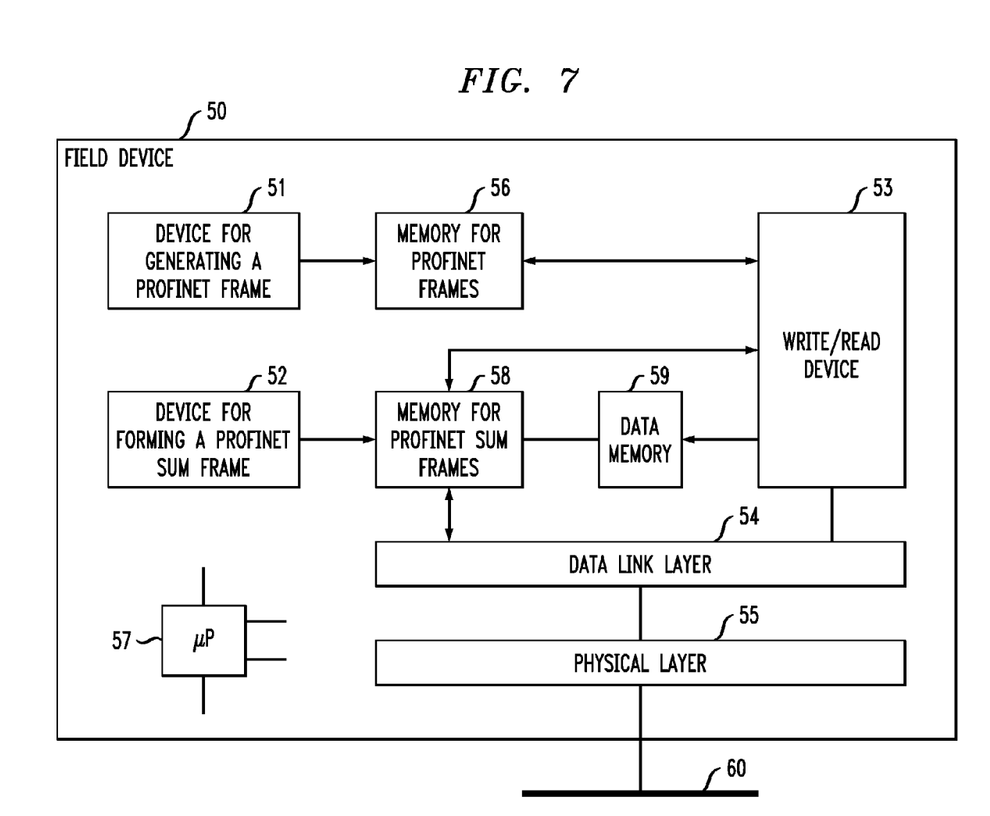

Let it be assumed in the present example that all field devices can indeed receive and relay conventional Profinet frames as well as Profinet sum frames, but that only field device 50 is capable of generating a Profinet sum frame, in order to be able to transmit data to the control device 20 during an input phase. The field device 50 is shown in more detail in FIG. 7. Both a generation device 51 for generating a conventional Profinet frame and a generation device 52 for generating a Profinet sum frame are provided in field device 50. It should be noted at this point that both the generation devices 110 and 120 shown in FIG. 6 and the generation devices 51 and 52 shown in FIG. 7 can each represent a single module, wherein the generation device for generating a Profinet sum frame first generates a conventional Profinet frame in this case, and then subdivides it into a number of data fields. Similarly to the optimization module shown in FIG. 6, a memory 56 for storing conventional Profinet frames is associated with the generation device 51, and a memory 58 for storing Profinet sum frames is associated with the generation device 52. A write/read device 53 serves to write data to the Profinet frame or frames stored in memory 56 and/or to write data to, or read it from, the Profinet sum frame stored in the memory 58. To receive and transmit data, the field device additionally has a data link layer 54 and a physical layer 55 that are constructed according to the Ethernet standard. The field device 50 is connected to the Ethernet 60 via the physical layer 55. The components of field device 50 are controlled and monitored by a microprocessor or a memory-programmable controller 57, which, together with its terminals, is shown only very schematically.

The mode of operation of the automation installation 10 illustrated in FIG. 1 for transmitting data in Profinet sum frames will now be explained in detail based on two embodiments, in connection with FIGS. 3 and 4.

Figure 3:
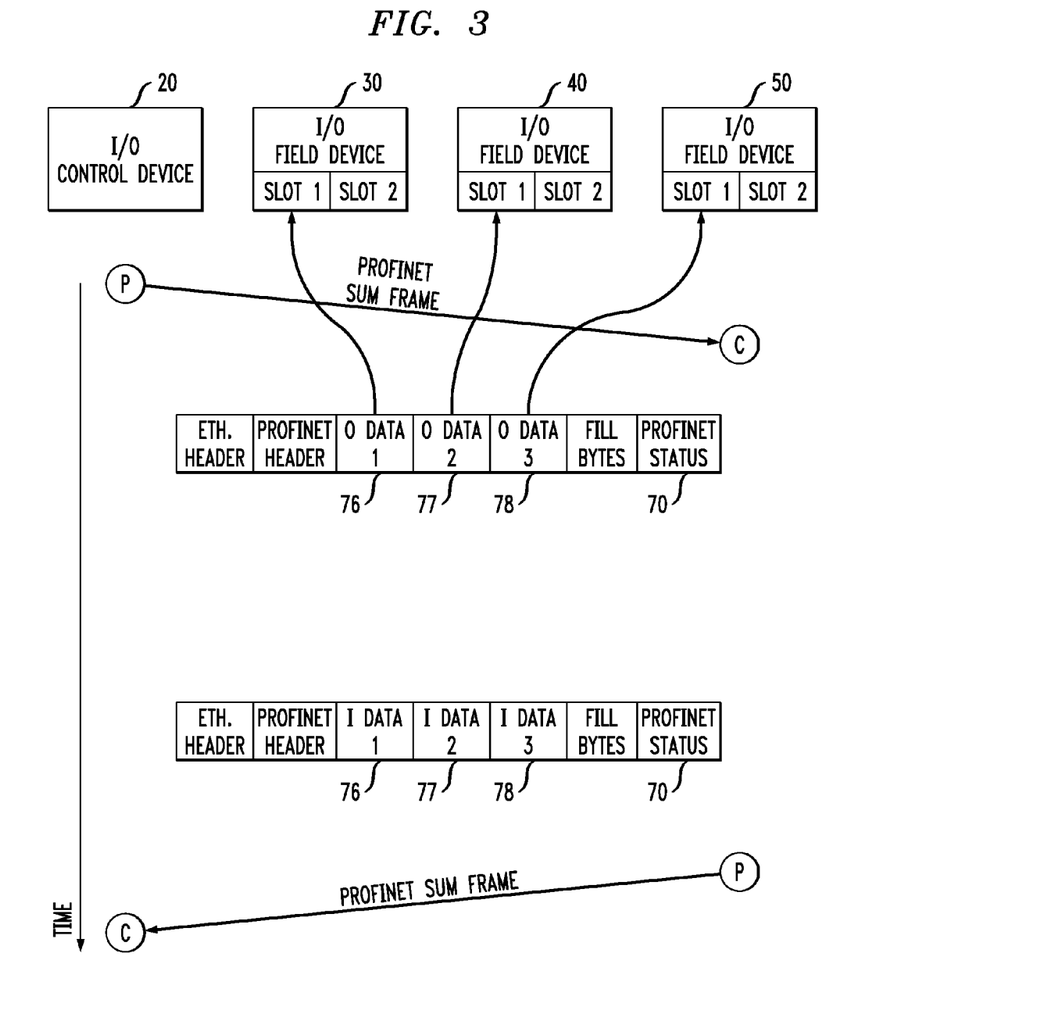

FIG. 3 schematically shows the field devices 30, 40 and 50 connected to the Ethernet 60, as well as the connected control device 20. In addition, a time sequence diagram is represented, which illustrates the transmission of a Profinet sum frame from the control device 20 to the field devices 30, 40 and 50, and the transmission of a Profinet sum frame from the field devices 50, 40 and 30 to the control device 20. The transmission time increases in the direction of the arrow of the vertically drawn time axis.

First, an application relation (AR), by means of which an application relation can be performed, is set up in the control device 20, in which the optimization module 100 is implemented in the present example. For this purpose, a provider application P is started in the control device 20, and a consumer application C is started in the field device 50. The provider application P of the control device 20 then ensures that the microprocessor 140 causes the generation device 120 to generate a Profinet sum frame with the data fields 76, 77 and 78 according to FIG. 5. Additionally, one or more bits that indicate the transmission of a Profinet sum frame are set in the Profinet status field 79 of the Ethernet packet shown in FIG. 5. The Profinet sum frame is then placed in the memory 150 by the generation device 120. Under control of the microprocessor 140, the reading device 170 writes the data of field devices 30, 40 and 50 that is available in a data memory 155 into the respective data field 76, 77, 78. Subsequently, the above-described Profinet sum frame is transferred from the memory 150 to the data link layer 180, which writes the Profinet sum frame into an Ethernet packet. The multicast address, which is likewise known to the three field devices 30, 40 and 50, is simultaneously written to the address field 72 of the packet shown in FIG. 5. Let it be assumed at this point that only a single fill byte must be transmitted in the Profinet sum frame. The Ethernet packet 70 likewise schematically shown in FIG. 3 is then directed via the physical layer 190 and the Ethernet 60 first to the field device 30, then from the latter to the field device 40 and finally from the latter to the field device 50. Based on the multicast address of the received Ethernet packet 70, the field device 30 recognizes, among other things, that the packet is intended for it. Additionally, the field device 30 has already been informed that the data intended for it is being transmitted in data field 76. The field device 30 reads or copies the data intended for it from the data field 76 and stores this data in memory 59, for example. The data is placed, for example, in two slots, Slot 1 and Slot 2, in the memory 59. Subsequently, the field device 30 relays the Ethernet packet 70 to the field device 40, which again recognizes from the multicast address that this packet is intended for it. The field device 40 knows that data for it is being transmitted in the data field 77, and reads it out. This data is also placed slot-by-slot in a memory. The Ethernet packet 70 is subsequently transmitted to the last field device 50, which now reads out the data contained in the data field 78 and stores it slot by slot. The data fields 76, 77 and 78 are preplanned sites that are known both to the optimization module 100 and to the respective field devices 30, 40 and 50.

If the field devices 30, 40 and 50 want to transfer data to the control device 20, an input procedure is initiated. For this purpose, a provider application is started in the field device 50, and a consumer application is started in the control device 20. Under the control of microprocessor 57, a Profinet sum frame is generated in the generation device 52 of the field device and placed in the memory 58. The write/read device 53 accesses the data memory 59, in which data to be transmitted to the control device 20 is placed slot by slot. This data is written under the control of the microprocessor 57 into the data field 78 of the generated Profinet sum frame, since this data field is assigned to the field device 50.

The Profinet sum frame is transferred from the memory 58 to the data link layer 54, which then embeds the Profinet sum frame in an Ethernet packet. In the data link layer 54, the multicast address is written into the address field 72 along with a corresponding indication in the Profinet status field of the transmission of a Profinet sum frame. The Ethernet packet is transferred by means of physical layer 55 to the field device 40 via the Ethernet 60. Based on the multicast address, the field device 40 recognizes that a Profinet sum frame is to be transmitted to the control device 20. Thereupon, the field device 40, if present, writes its data intended for the control device 20 into the data field 77 that is assigned to it and relays the Ethernet packet to field device 30. The field device 30, if present, writes its data to be transmitted to the control device 20 into the data field 76 assigned to this field device in the Profinet sum frame and transmits the Ethernet packet to the control device 20. It should be noted that the field device 30 in the present example has written only one fill byte into the Profinet sum frame, in order to fill the data to be transferred up the entire payload data length of the Profinet sum frame. The consumer application assures that the data of the field devices 30, 40 and 50 is read out from the appropriate fields and further processed. The corresponding Ethernet packet transmitted to the control device is likewise schematically shown in FIG. 3. It should be noted in this regard that the Profinet sum frame transmitted from the control device to the field devices contains output data (O data), while the Profinet sum frame transmitted from the field devices to the control device 20 contains input data (I data). It is conceivable that the Profinet sum frame shown in FIG. 3 does not contain all data for the field devices 30, 40 and 50, but only a part of the respective data, which is stored in a respective slot 1 of the field device in question.

Consequently, the remaining part of the data must be transmitted in a second Profinet sum frame from control device 20 to the field devices 30, 40 and 50. In a similar manner, it is conceivable that the lower Profinet sum frame shown in FIG. 3 only transmits input data for the control device 20, which is stored in each case in one of the two slots—Slot 1 or Slot 2—of the field devices 30, 40 and 50. In this case, the remaining data is transmitted in an additional Profinet sum frame from the field devices to the control device 20.

FIG. 4 shows another embodiment of the transmission of data in a Profinet sum frame between the control device 20 and the field devices 30, 40 and 50. Unlike the embodiment shown in FIG. 3, the optimization module 100 illustrated in FIG. 6 is now housed in the head station 80, which in the present example is a separate field device, likewise connected to the Ethernet 60. However, one of the field devices 30, 40 or 50 could form the head station 80.

One advantage of the embodiment shown in FIG. 4 is that a conventional control device in conformity with the Profinet standard can be used. If data is now to be transmitted to the field devices, the control device 20 first sets up a separate application relation to the head station 80 for each field device. Subsequently, the control device 20 generates a separate conventional Profinet frame, transmitted in an Ethernet packet to the head station 80, for each field device, as is schematically represented by three connections between three provider applications P implemented in the control device 20 and the diamond 81 represented in FIG. 4. The Ethernet packet contains the source address of the control device 20 and the destination address of the respective field device. The Ethernet packets that are associated with the field devices 30, 40 and 50 are first written into the memory 160 in the optimization module 100 of the head station 80. The optimization module 100 then generates a Profinet sum frame with the data fields 76, 77 and 78. The microprocessor 140 of the optimization module 180 drives the write/read device 170, which then writes the data contained in the individual Profinet frame of the respective field devices into the Profinet sum frame stored in the memory 150, in such a manner that the data intended for the field device 30 is written into the data field 76, the data intended for the field device 40 is written into the data field 77, and the data intended for the field device 50 is written into the data field 78. In addition, the optimization module 100 in the data link layer 180 replaces the destination addresses of the respective field devices contained in the conventional Profinet frames by the agreed-upon multicast address. The address of the control device 20 or of the head station 80 can be contained in the source address field 77. The head station 80 transmits the Ethernet packet containing the Profinet sum frame via the physical layer 190 and the communications network 60 to the field device 30 which, similarly to the method described in connection with FIG. 3, reads out the data in the associated data field 76 and then transmits the Ethernet packet 70 to the field device 40. The field device 40 in turn reads out the data intended for it from the data field 77 and relays the Ethernet packet via the communications network 60 to the field device 50. The field device 50 in turn reads out the data intended for it from the data field 78.

Now let it be assumed that data is to be transmitted from the field devices to the control device 20. For this purpose, the field device 50 first generates a Profinet sum frame, similarly to the procedure already explained in connection with FIG. 3. Then the field device 50 writes the data intended for the control device 20 into the data field 78. In the data link layer 54 of the field device 50, the Profinet sum frame is embedded into an Ethernet packet and transmitted to the field device 40 using the multicast address. Similarly to the explanations for FIG. 3, the field device 40 writes the data intended for the control device 20 into the data field 77 and relays the Ethernet packet to the field device 30, which in turn writes the data intended for the control device 20 into the data field 76 of the Profinet sum frame. Then the field device 30 transmits the Ethernet packet to the head station 80, as is schematically represented by the diamond 82 in FIG. 4.

In the data link layer 180, the optimization module 100 of the head station 80 removes the Profinet sum frame from the received Ethernet packet and writes the Profinet sum frame into the memory 150. Under the control of the microprocessor 140, the data stored in the data fields 76, 77 and 78 is written to a respective separate Profinet frame that is generated in the generation device 110 and placed in the memory 160. The Profinet frames associated with the three field devices 30, 40 and 50 are transferred from the memory 160 to the data link layer 180, which embeds each conventional Profinet frame into a separate Ethernet packet. In a preferred embodiment, the source address of the respective field device and the address of the control device 20 as the destination address are written in the data link layer 54 into each Ethernet packet. Subsequently the optimization module 100 of the head station 80 transmits each Ethernet packet that is assigned to one of the field devices 30, 40 or 50 to the control device 20 via the physical layer 190 and the Ethernet 60. This transmission is schematically represented in FIG. 4 by three communication relations between the diamond 82 and the consumer applications C of the control device 20.

Thereby the communication cycle for transmitting data from control device 20 to the field devices 30, 40 or 50, as well as the transmission of data from the field devices 30, 40 and 50 to the control device 20, is concluded.

It should be noted at this point that the decision device 130 of the optimization module 100 is capable of recognizing, based on the amount of data to be transmitted to one or more field devices 30, 40 and 50 and in the opposite direction from at least one of the field devices to the control device 20, whether the respective data is to be transmitted in conventional separate Profinet frames or in a common Profinet sum frame. If the decision device 130 recognizes, for instance, that the control device 20 would like to transmit to the field device 30 data that occupies the payload data length of a conventional Profinet frame completely or almost completely, and that data is present for the field devices 40 and 50 for example, that would completely or nearly completely occupy a Profinet sum frame, then the decision device 130 causes the control device 20 to transmit data to the field device 30 in a conventional Profinet frame that has been generated in the device 110, while the data to the field devices 40 and 50 is transmitted in a Profinet sum frame, as previously explained in detail with reference to FIGS. 3 and 4.

The invention claimed is:

1. A method for optimizing transmission of data between a control device and a plurality of N field devices that are connected to one another via an IP-based communications network, wherein the data transmission is controlled using a Profinet protocol, the method comprising:
    a) generating a single first Profinet data frame according to the Profinet protocol for transmitting data to the plurality of N field devices;
    b) subdividing the first Profinet data frame into N data fields that are associated with the N field devices in a predetermined manner;
    c) writing into each data field of the first Profinet data frame data for the field device which is associated with the respective data field, insofar as data is present for this field device;
    d) transmitting the subdivided first Profinet data frame to each of the N field devices, wherein for transmission the subdivided first Profinet data frame is embedded into an Ethernet packet; and
    e) upon reception of the Ethernet packet, into which the subdivided first Profinet data frame is embedded, reading out the data from each data field by the field device which is associated with the respective data field.

2. The method according to claim 1, further comprising:
    f) generating a single second Profinet data frame according to the Profinet protocol for transmitting data of the N field devices to the control device;
    g) subdividing the second Profinet data frame into N data fields that are associated with the N field devices in a predetermined manner;
    h) transferring the subdivided second Profinet data frame to one of the N field devices;
    i) upon reception of the subdivided second Profinet data frame at the one field device, writing the data, insofar as available, into the data field of the subdivided Profinet data frame associated with the one field device; and
    j) repeating steps h) and i) until the subdivided second Profinet data frame has passed all N field devices.

3. The method according to claim 1, further comprising:
    deciding, depending on the amount of data to be transmitted to the N field devices and/or from the N field devices, whether the data from the N field devices and/or to the N field devices will be transported in a single subdivided Profinet frame, or whether the data from and/or to at least one of the N field devices will be transmitted in a respective separate conventional Profinet frame.

4. The method according to claim 1, wherein steps a) through e) are cyclically repeated until all data has been completely transmitted.

5. The method according to claim 1, wherein steps a) through d) are performed by the control device.

6. The method according to claim 1, wherein steps a) through d) are performed by an optimization device associated with the control device, wherein the following steps are performed in the control device before the performance of step a):
    generating a Profinet data frame for each of the N field devices to which data is to be transmitted;
    writing the data intended for a field device into the respective Profinet data frame; and
    transmitting the Profinet data frame to the optimization device using a destination address of the respective field device, wherein the destination address of each field device is replaced in step c) by a multicast address.

7. The method according to claim 6, characterized by:
    receiving at the optimization device a subdivided Profinet data frame that is intended for the control device;
    writing the data of each data field of the subdivided Profinet data frame into a separate Profinet data frame; and
    transmitting each Profinet data frame to the control device, using a source address of the respective field device.

8. A method for optimizing transmission of data between a control device and a plurality of N field devices that are connected to one another via an IP-based communications network, wherein the data transmission is controlled using a Profinet protocol, the method comprising:
    a) generating a single Profinet data frame according to the Profinet protocol for transmitting data of the N field devices to the control device;
    b) subdividing the Profinet data frame into N data fields that are associated with the N field devices in a predetermined manner;
    c) transferring the subdivided Profinet data frame to one of the N field devices, wherein for transmission the subdivided Profinet data frame is embedded into an Ethernet packet;
    d) upon reception of the Ethernet packet, into which the subdivided Profinet data frame is embedded, at the one field device, writing the data, insofar as available, into the data field of the subdivided Profinet data frame associated with the one field device; and
    e) repeating steps c) and d) until the subdivided Profinet data frame has passed all N field devices.

9. The method according to claim 8, wherein steps a) through e) are cyclically repeated until all data has been completely transmitted.

10. A control and data transmission system for optimized transmission of data, the control and data transmission system comprising:
    a control device and a plurality of N field devices that are connected to one another by an IP-based communications network, wherein a Profinet protocol is used as communications protocol; and an optimization device for optimizing the data transmission associated with the control device, having the following characteristics:
- a first device for generating a single data frame according to the Profinet protocol for transmitting data to the N field devices,
- a second device for subdividing the Profinet data frame into N data fields and for associating the N data fields with the end N field devices in a predetermined manner,
- a third device for targeted writing of data into the data fields of the subdivided Profinet data frame, and
- a fourth device for transmitting the subdivided Profinet data frame to each of the N field devices, wherein for transmission the subdivided Profinet data frame is embedded into an Ethernet packet;

wherein each field device is adapted to, upon reception of the Ethernet packet, into which the subdivided Profinet data frame is embedded, read out the data intended for it from the data field of the subdivided Profinet data frame associated with it.

11. The control and data transmission system according to claim 10, wherein the optimization device is implemented in the control device.

12. The control and data transmission system according to claim 10, wherein
the optimization device is implemented in one of the field devices, or forms a separate device that is connected to the communications network, wherein the optimization device has the following additional features:
- a fifth device for receiving conventional Profinet data frames, each intended for one of the N field devices, from the control device,
- a device for reading out data from the received Profinet frames, wherein a writing device is capable of writing the read-out data into the data fields of the Profinet frame that is associated with the respective field devices,
- a sixth device for receiving a subdivided Profinet data frame intended for the control device,
- a device for writing the data of each data field of the subdivided Profinet data frame into a separate conventional Profinet data frame, and
- a device for transmitting the conventional Profinet data frames to the control device, using a source address of the respective field device.

13. The control and data transmission system according to claim 10, wherein at least one of the N field devices has a device for generating a data frame according to the Profinet protocol for transmitting data to the control device, and a device for subdividing the Profinet data frame into N data fields, wherein each field device is capable of writing data in the data field associated with the respective field device of the subdivided Profinet data frame.

14. The control and data transmission system according to claim 10, wherein the optimization device has a device for writing a multicast address into an IP packet for transmission of the subdivided Profinet data frame to the N field devices.

15. The control and data transmission system according to claim 14, wherein the IP-based communications network is constructed according to an Ethernet standard.

16. The control and data transmission system according to claim 10, wherein
the optimization device has a decision device which, depending on the amount of data to be transmitted to the N field devices and/or from the N field devices, decides whether the data from the N field devices and/or to the N field devices will be transmitted in a respective single subdivided Profinet data frame, or whether the data will be transmitted from and/or to at least one of the N field devices in a respective separate conventional Profinet data frame.

* * * * *

UNITED STATES PATENT AND TRADEMARK OFFICE
CERTIFICATE OF CORRECTION

PATENT NO.         : 8,670,460 B2                                                Page 1 of 1
APPLICATION NO.    : 12/438498
DATED              : March 11, 2014
INVENTOR(S)        : Breit et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 461 days.

Signed and Sealed this
Twenty-ninth Day of September, 2015

Michelle K. Lee
*Director of the United States Patent and Trademark Office*